United States Patent
Agarwala et al.

(10) Patent No.: US 7,716,034 B2
(45) Date of Patent: *May 11, 2010

(54) MULTI-PORT TRACE DATA HANDLING

(75) Inventors: Manisha Agarwala, Richardson, TX (US); Lewis Nardini, Dallas, TX (US); John M. Johnsen, Dallas, TX (US); Maria B. H. Gill, Plano, TX (US); Jose L. Flores, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 822 days.

This patent is subject to a terminal disclaimer.

(21) Appl. No.: 11/467,735

(22) Filed: Aug. 28, 2006

(65) Prior Publication Data

US 2006/0288254 A1 Dec. 21, 2006

Related U.S. Application Data

(62) Division of application No. 10/302,193, filed on Nov. 22, 2002, now Pat. No. 7,127,387.

(51) Int. Cl.
*G06F 9/455* (2006.01)
*G06F 17/50* (2006.01)

(52) U.S. Cl. .............................. 703/23; 703/24; 703/28; 716/16

(58) Field of Classification Search .................... 703/24, 703/28; 716/16
See application file for complete search history.

(56) References Cited

U.S. PATENT DOCUMENTS

| 5,321,828 | A | * | 6/1994 | Phillips et al. ................. 703/28 |
| 5,642,478 | A | * | 6/1997 | Chen et al. .................... 714/45 |
| 5,659,752 | A | * | 8/1997 | Heisch et al. ................ 717/158 |
| 5,754,827 | A | * | 5/1998 | Barbier et al. ................. 703/14 |
| 6,615,370 | B1 | | 9/2003 | Edwards et al. |
| 6,684,348 | B1 | | 1/2004 | Edwards et al. |
| 6,836,882 | B2 | * | 12/2004 | Swoboda ..................... 717/134 |
| 2002/0065642 | A1 | | 5/2002 | Swoboda |
| 2002/0178405 | A1 | * | 11/2002 | McCullough et al. ......... 714/45 |

* cited by examiner

*Primary Examiner*—Kamini S Shah
*Assistant Examiner*—David Silver
(74) *Attorney, Agent, or Firm*—Robert D. Marshall, Jr.; W. James Brady; Frederick J. Telecky, Jr.

(57) ABSTRACT

A method of trace data compression receives trace data on a first port and a second port stores a prior data value. If trace data is received on only one port, then that trace data is transmitted as an indication of matching and non-matching sections between the current trace data and the stored data value and the non-matching sections of the current trace data on the one port. If trace data is received on both ports, then the first port trace data is transmitted relative to the prior stored value and the second port trace data is transmitted relative to the first port trace data. The stored prior data is reset to zero upon each initiation or termination of trace data on either port. The stored prior value is set to the second port value or the first port value if no second port value is received.

4 Claims, 6 Drawing Sheets

MULTI-PORT TRACE DATA HANDLING

This application is a divisional of U.S. patent application Ser. No. 10/302,193 filed Nov. 22, 2002 now U.S. Pat. No. 7,127,387.

TECHNICAL FIELD OF THE INVENTION

The technical field of this invention is emulation hardware particularly for highly integrated digital signal processing systems.

BACKGROUND OF THE INVENTION

Advanced wafer lithography and surface-mount packaging technology are integrating increasingly complex functions at both the silicon and printed circuit board level of electronic design. Diminished physical access to circuits for test and emulation is an unfortunate consequence of denser designs and shrinking interconnect pitch. Designed-in testability is needed so the finished product is both controllable and observable during test and debug. Any manufacturing defect is preferably detectable during final test before a product is shipped. This basic necessity is difficult to achieve for complex designs without taking testability into account in the logic design phase so automatic test equipment can test the product.

In addition to testing for functionality and for manufacturing defects, application software development requires a similar level of simulation, observability and controllability in the system or sub-system design phase. The emulation phase of design should ensure that a system of one or more ICs (integrated circuits) functions correctly in the end equipment or application when linked with the system software. With the increasing use of ICs in the automotive industry, telecommunications, defense systems, and life support systems, thorough testing and extensive real-time debug becomes a critical need.

Functional testing, where the designer generates test vectors to ensure conformance to specification, still remains a widely used test methodology. For very large systems this method proves inadequate in providing a high level of detectable fault coverage. Automatically generated test patterns are desirable for full testability, and controllability and observability. These are key goals that span the full hierarchy of test from the system level to the transistor level.

Another problem in large designs is the long time and substantial expense involved in design for test. It would be desirable to have testability circuitry, system and methods that are consistent with a concept of design-for-reusability. In this way, subsequent devices and systems can have a low marginal design cost for testability, simulation and emulation by reusing the testability, simulation and emulation circuitry, systems and methods that are implemented in an initial device. Without a proactive testability, simulation and emulation plan, a large amount of subsequent design time would be expended on test pattern creation and upgrading.

Even if a significant investment were made to design a module to be reusable and to fully create and grade its test patterns, subsequent use of a module may bury it in application specific logic. This would make its access difficult or impossible. Consequently, it is desirable to avoid this pitfall.

The advances of IC design are accompanied by decreased internal visibility and control, reduced fault coverage and reduced ability to toggle states, more test development and verification problems, increased complexity of design simulation and continually increasing cost of CAD (computer aided design) tools. In the board design the side effects include decreased register visibility and control, complicated debug and simulation in design verification, loss of conventional emulation due to loss of physical access by packaging many circuits in one package, increased routing complexity on the board, increased costs of design tools, mixed-mode packaging, and design for produceability. In application development, some side effects are decreased visibility of states, high speed emulation difficulties, scaled time simulation, increased debugging complexity, and increased costs of emulators. Production side effects involve decreased visibility and control, complications in test vectors and models, increased test complexity, mixed-mode packaging, continually increasing costs of automatic test equipment and tighter tolerances.

Emulation technology utilizing scan based emulation and multiprocessing debug was introduced more than 10 years ago. In 1988, the change from conventional in circuit emulation to scan based emulation was motivated by design cycle time pressures and newly available space for on-chip emulation. Design cycle time pressure was created by three factors. Higher integration levels, such as increased use of on-chip memory, demand more design time. Increasing clock rates mean that emulation support logic causes increased electrical intrusiveness. More sophisticated packaging causes emulator connectivity issues. Today these same factors, with new twists, are challenging the ability of a scan based emulator to deliver the system debug facilities needed by today's complex, higher clock rate, highly integrated designs. The resulting systems are smaller, faster, and cheaper. They have higher performance and footprints that are increasingly dense. Each of these positive system trends adversely affects the observation of system activity, the key enabler for rapid system development. The effect is called "vanishing visibility."

FIG. 1 illustrates the trend in visibility and control over time and greater system integration. Application developers prefer the optimum visibility level illustrated in FIG. 1. This optimum visibility level provides visibility and control of all relevant system activity. The steady progression of integration levels and increases in clock rates steadily decrease the actual visibility and control available over time. These forces create a visibility and control gap, the difference between the optimum visibility and control level and the actual level available. Over time, this gap will widen. Application development tool vendors are striving to minimize the gap growth rate. Development tools software and associated hardware components must do more with less resources and in different ways. Tackling this ease of use challenge is amplified by these forces.

With today's highly integrated System-On-a-Chip (SOC) technology, the visibility and control gap has widened dramatically over time. Traditional debug options such as logic analyzers and partitioned prototype systems are unable to keep pace with the integration levels and ever increasing clock rates of today's systems. As integration levels increase, system buses connecting numerous subsystem components move on chip, denying traditional logic analyzers access to these buses. With limited or no significant bus visibility, tools like logic analyzers cannot be used to view system activity or provide the trigger mechanisms needed to control the system under development. A loss of control accompanies this loss in visibility, as it is difficult to control things that are not accessible.

To combat this trend, system designers have worked to keep these buses exposed. Thus the system components were built in a way that enabled the construction of prototyping systems with exposed buses. This approach is also under siege from the ever-increasing march of system clock rates. As the central processing unit (CPU) clock rates increase, chip to chip interface speeds are not keeping pace. Developers find that a partitioned system's performance does not keep pace with its integrated counterpart, due to interface wait states added to compensate for lagging chip to chip communication rates. At some point, this performance degradation reaches intolerable levels and the partitioned prototype system is no longer a viable debug option. In the current era production devices must serve as the platform for application development.

Increasing CPU clock rates are also limiting availability of other simple visibility mechanisms. Since the CPU clock rates can exceed the maximum I/O state rates, visibility ports exporting information in native form can no longer keep up with the CPU. On-chip subsystems are also operated at clock rates that are slower than the CPU clock rate. This approach may be used to simplify system design and reduce power consumption. These developments mean simple visibility ports can no longer be counted on to deliver a clear view of CPU activity. As visibility and control diminish, the development tools used to develop the application become less productive. The tools also appear harder to use due to the increasing tool complexity required to maintain visibility and control. The visibility, control, and ease of use issues created by systems-on-a-chip tend to lengthen product development cycles.

Even as the integration trends present developers with a tough debug environment, they also present hope that new approaches to debug problems will emerge. The increased densities and clock rates that create development cycle time pressures also create opportunities to solve them. On-chip, debug facilities are more affordable than ever before. As high speed, high performance chips are increasingly dominated by very large memory structures, the system cost associated with the random logic accompanying the CPU and memory subsystems is dropping as a percentage of total system cost. The incremental cost of several thousand gates is at an all time low. Circuits of this size may in some cases be tucked into a corner of today's chip designs. The incremental cost per pin in today's high density packages has also dropped. This makes it easy to allocate more pins for debug. The combination of affordable gates and pins enables the deployment of new, on-chip emulation facilities needed to address the challenges created by systems-on-a-chip.

When production devices also serve as the application debug platform, they must provide sufficient debug capabilities to support time to market objectives. Since the debugging requirements vary with different applications, it is highly desirable to be able to adjust the on-chip debug facilities to balance time to market and cost needs. Since these on-chip capabilities affect the chip's recurring cost, the scalability of any solution is of primary importance. "Pay only for what you need" should be the guiding principle for on-chip tools deployment. In this new paradigm, the system architect may also specify the on-chip debug facilities along with the remainder of functionality, balancing chip cost constraints and the debug needs of the product development team.

FIG. 2 illustrates an emulator system 100 including four emulator components. These four components are: a debugger application program 110; a host computer 120; an emulation controller 130; and on-chip debug facilities 140. FIG. 2 illustrates the connections of these components. Host computer 120 is connected to an emulation controller 130 external to host 120. Emulation controller 130 is also connected to target system 140. The user preferably controls the target application on target system 140 through debugger application program 110.

Host computer 120 is generally a personal computer. Host computer 120 provides access the debug capabilities through emulator controller 130. Debugger application program 110 presents the debug capabilities in a user-friendly form via host computer 120. The debug resources are allocated by debug application program 110 on an as needed basis, relieving the user of this burden. Source level debug utilizes the debug resources, hiding their complexity from the user. Debugger application program 110 together with the on-chip trace and triggering facilities provide a means to select, record, and display chip activity of interest. Trace displays are automatically correlated to the source code that generated the trace log. The emulator provides both the debug control and trace recording function.

The debug facilities are preferably programmed using standard emulator debug accesses through a JTAG or similar serial debug interface. Since pins are at a premium, the preferred embodiment of the invention provides for the sharing of the debug pin pool by trace, trigger, and other debug functions with a small increment in silicon cost. Fixed pin formats may also be supported. When the pin sharing option is deployed, the debug pin utilization is determined at the beginning of each debug session before target system 140 is directed to run the application program. This maximizes the trace export bandwidth. Trace bandwidth is maximized by allocating the maximum number of pins to trace.

The debug capability and building blocks within a system may vary. Debugger application program 100 therefore establishes the configuration at runtime. This approach requires the hardware blocks to meet a set of constraints dealing with configuration and register organization. Other components provide a hardware search capability designed to locate the blocks and other peripherals in the system memory map. Debugger application program 110 uses a search facility to locate the resources. The address where the modules are located and a type ID uniquely identifies each block found. Once the IDs are found, a design database may be used to ascertain the exact configuration and all system inputs and outputs.

Host computer 120 generally includes at least 64 Mbytes of memory and is capable of running Windows 95, SR-2, Windows NT, or later versions of Windows. Host computer 120 must support one of the communications interfaces required by the emulator. These may include: Ethernet 10T and 100T; TCP/IP protocol; Universal Serial Bus (USB); Firewire IEEE 1394; and parallel port such as SPP, EPP and ECP.

Host computer 120 plays a major role in determining the real-time data exchange bandwidth. First, the host to emulator communication plays a major role in defining the maximum sustained real-time data exchange bandwidth because emulator controller 130 must empty its receive real-time data exchange buffers as fast as they are filled. Secondly, host computer 120 originating or receiving the real-time data exchange data must have sufficient processing capacity or disc bandwidth to sustain the preparation and transmission or processing and storing of the received real-time data exchange data. A state of the art personal computer with a Firewire communication channel (IEEE 1394) is preferred to obtain the highest real-time data exchange bandwidth. This bandwidth can be as much as ten times greater performance than other communication options.

Emulation controller 130 provides a bridge between host computer 120 and target system 140. Emulation controller 130 handles all debug information passed between debugger application program 110 running on host computer 120 and a target application executing on target system 140. A presently preferred minimum emulator configuration supports all of the following capabilities: real-time emulation; real-time data exchange; trace; and advanced analysis.

Emulation controller 130 preferably accesses real-time emulation capabilities such as execution control, memory, and register access via a 3, 4, or 5 bit scan based interface. Real-time data exchange capabilities can be accessed by scan or by using three higher bandwidth real-time data exchange formats that use direct target to emulator connections other than scan. The input and output triggers allow other system components to signal the chip with debug events and vice-versa. Bit I/O allows the emulator to stimulate or monitor system inputs and outputs. Bit I/O can be used to support factory test and other low bandwidth, non-time-critical emulator/target operations. Extended operating modes are used to specify device test and emulation operating modes. Emulator controller 130 is partitioned into communication and emulation sections. The communication section supports host communication links while the emulation section interfaces to the target, managing target debug functions and the device debug port. Emulation controller 130 communicates with host computer 120 using one of industry standard communication links outlined earlier herein. The host to emulator connection is established with off the shelf cabling technology. Host to emulator separation is governed by the standards applied to the interface used.

Emulation controller 130 communicates with the target system 140 through a target cable or cables. Debug, trace, triggers, and real-time data exchange capabilities share the target cable, and in some cases, the same device pins. More than one target cable may be required when the target system 140 deploys a trace width that cannot be accommodated in a single cable. All trace, real-time data exchange, and debug communication occurs over this link. Emulator controller 130 preferably allows for a target to emulator separation of at least two feet. This emulation technology is capable of test clock rates up to 50 MHZ and trace clock rates from 200 to 300 MHZ, or higher. Even though the emulator design uses techniques that should relax target system 140 constraints, signaling between emulator controller 130 and target system 140 at these rates requires design diligence. This emulation technology may impose restrictions on the placement of chip debug pins, board layout, and requires precise pin timings. On-chip pin macros are provided to assist in meeting timing constraints.

The on-chip debug facilities offer the developer a rich set of development capability in a two tiered, scalable approach. The first tier delivers functionality utilizing the real-time emulation capability built into a CPU's mega-modules. This real-time emulation capability has fixed functionality and is permanently part of the CPU while the high performance real-time data exchange, advanced analysis, and trace functions are added outside of the core in most cases. The capabilities are individually selected for addition to a chip. The addition of emulation peripherals to the system design creates the second tier functionality. A cost-effective library of emulation peripherals contains the building blocks to create systems and permits the construction of advanced analysis, high performance real-time data exchange, and trace capabilities. In the preferred embodiment five standard debug configurations are offered, although custom configurations are also supported. The specific configurations are covered later herein.

SUMMARY OF THE INVENTION

The trade architecture supports multiple data ports. Data may be transmitted on zero, one or more than one port. Data compression employs differential data values relative to the previous data instead of the complete data value.

BRIEF DESCRIPTION OF THE DRAWINGS

These and other aspects of this invention are illustrated in the drawings, in which.

DETAILED DESCRIPTION OF PREFERRED EMBODIMENTS

Trace data is received on multiple ports. However, this trace data is transmitted serially. Due to differential data coding, the continuity in data decoding cannot be broken. Regardless of the data received in parallel, the data must be transmitted with respect to the previous data. Thus the user can reconstruct the stream of data accesses from the received data stream.

Figure 3:
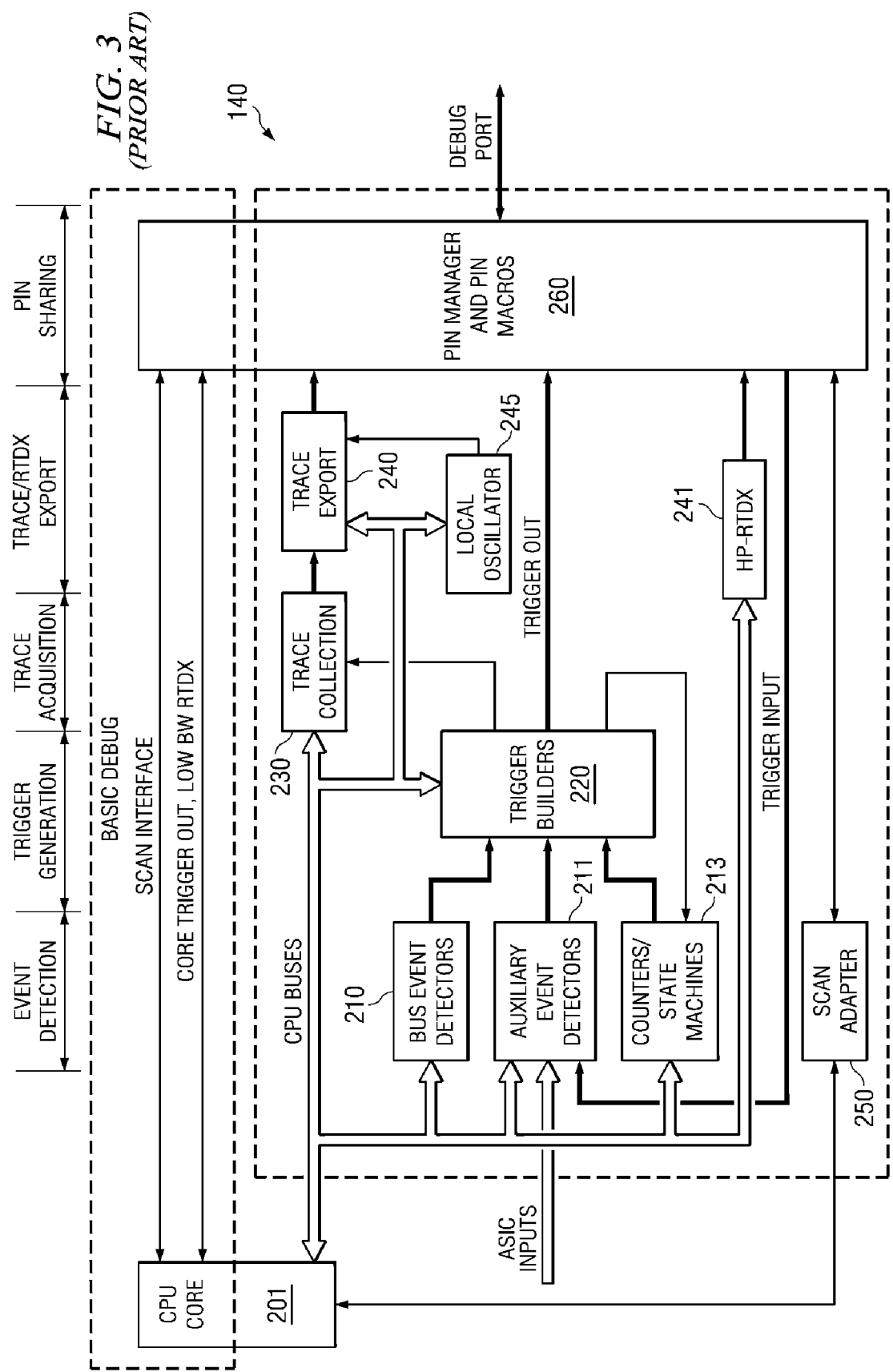
FIG. 3 illustrates in block diagram form a typical integrated circuit employing configurable emulation capability.

FIG. 3 illustrates an example of one on-chip debug architecture embodying target system 140. The architecture uses several module classes to create the debug function. One of these classes is event detectors including bus event detectors 210, auxiliary event detectors 211 and counters/state machines 213. A second class of modules is trigger generators including trigger builders 220. A third class of modules is data acquisition including trace collection 230 and formatting. A fourth class of modules is data export including trace export 240, and real-time data exchange export 241. Trace export 240 is controlled by clock signals from local oscillator 245. Local oscillator 245 will be described in detail below. A final class of modules is scan adaptor 250, which interfaces scan input/output to CPU core 201. Final data formatting and pin selection occurs in pin manager and pin micros 260.

The size of the debug function and its associated capabilities for any particular embodiment of a system-on-chip may be adjusted by either deleting complete functions or limiting the number of event detectors and trigger builders deployed. Additionally, the trace function can be incrementally increased from program counter trace only to program counter and data trace along with ASIC and CPU generated data. The real-time data exchange function may also be optionally deployed. The ability to customize on-chip tools changes the application development paradigm. Historically, all chip designs with a given CPU core were limited to a fixed set of debug capability. Now, an optimized debug capability is available for each chip design. This paradigm change gives system architects the tools needed to manage product development risk at an affordable cost. Note that the same CPU core may be used with differing peripherals with differing pin outs to embody differing system-on-chip products. These differing embodiments may require differing debug and emulation resources. The modularity of this invention permits each such embodiment to include only the necessary debug and emulation resources for the particular system-on-chip application.

The real-time emulation debug infrastructure component is used to tackle basic debug and instrumentation operations related to application development. It contains all execution control and register visibility capabilities and a minimal set of real-time data exchange and analysis such as breakpoint and watchpoint capabilities. These debug operations use on-chip hardware facilities to control the execution of the application and gain access to registers and memory. Some of the debug operations which may be supported by real-time emulation are: setting a software breakpoint and observing the machine state at that point; single step code advance to observe exact instruction by instruction decision making; detecting a spurious write to a known memory location; and viewing and changing memory and peripheral registers.

Real-time emulation facilities are incorporated into a CPU mega-module and are woven into the fabric of CPU core 201. This assures designs using CPU core 201 have sufficient debug facilities to support debugger application program 110 baseline debug, instrumentation, and data transfer capabilities. Each CPU core 201 incorporates a baseline set of emulation capabilities. These capabilities include but are not limited to: execution control such as run, single instruction step, halt and free run; displaying and modifying registers and memory; breakpoints including software and minimal hardware program breakpoints; and watchpoints including minimal hardware data breakpoints.

When trace streams are switched ON or OFF using the triggers, markers are generated. Various streams are synchronized using markers called sync points. The sync points provide a unique identifier field and a context to the data that will follow it. All streams may generate a sync point with this unique identifier. The information in the sync point is valid only at a legal instruction boundary.

Consider the case of tracing data processor activity and generating timing, program counter and data streams. Table 1 shows an example relationship between these trace streams and their respective sync points. Context information is transmitted only in the program counter stream. There is no order dependency of the various trace streams with each other. However within each trace stream the order cannot be changed between sync points.

TABLE 1

| Timing stream | PC stream | Data stream |
| --- | --- | --- |
| Timing sync point, id = 1 | PC sync point, id = 1 | Data sync point, id = 1 |
| Timing data | | |
| | PC data | Memory Data |
| Timing data | | Memory Data |

TABLE 1-continued

| Timing stream | PC stream | Data stream |
| --- | --- | --- |
| Timing data | PC data | Memory Data |
| | PC data | |
| Timing data | | Memory Data |
| Timing sync point, id = 2 | PC sync point, id = 2 | Data sync point, id = 2 |

Figure 1:
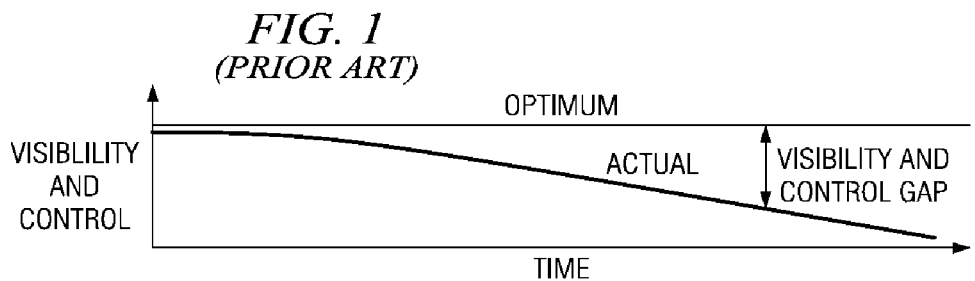
FIG. 1 illustrates the visibility and control of typical integrated circuits as a function of time due to increasing system integration.
Figure 2:
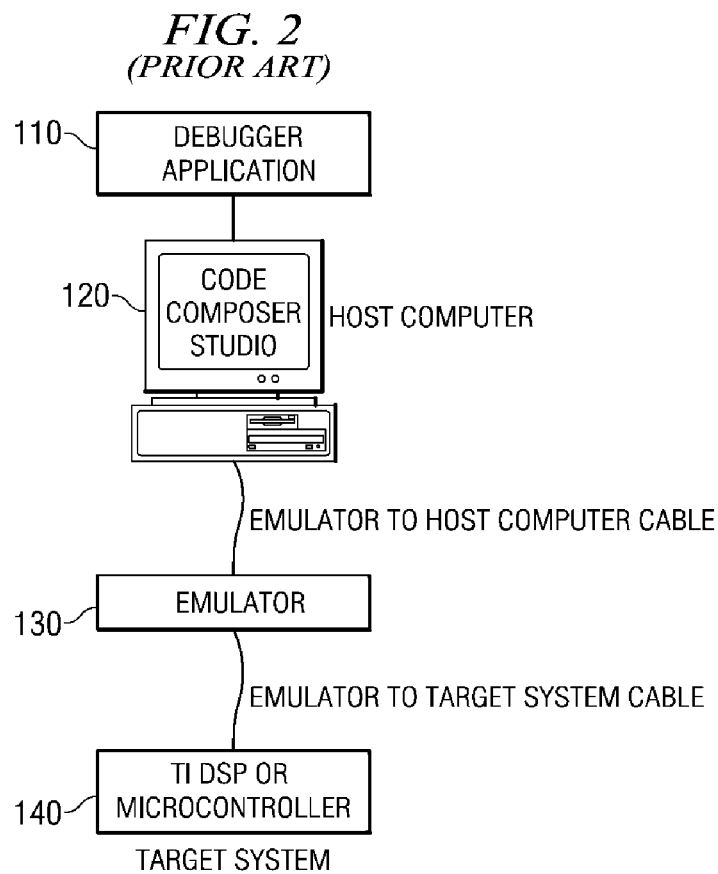
FIG. 2 illustrates an emulation system to which this invention is applicable.
Figure 4:
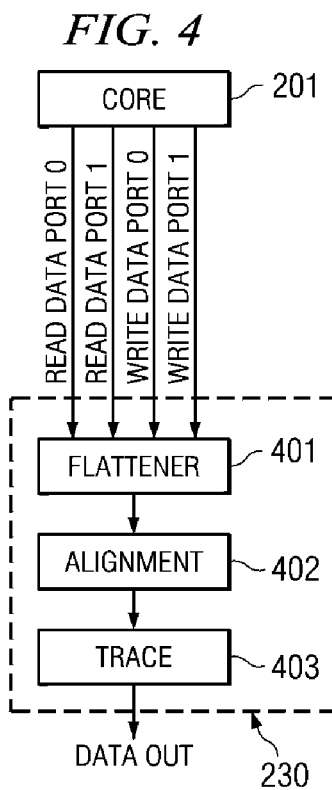
FIG. 4 illustrates in block diagram form a detail of the trace collection hardware according to this invention.

FIG. 4 illustrates a detail of trace collection 230. Trace collection 230 hardware gets new trace data from the CPU core 201 every cycle. This trace comes form different pipeline stages of CPU core 201. Pipeline flattener 401 combines all data from different clock cycles within the instruction pipeline that correspond to the same instruction. The data for each instruction is complete at the output of pipeline flattener 401. Alignment logic 402 aligns the data coming from other parts of the emulation logic with the output of pipeline flattener 401. This data then goes to trace logic 403.

Figure 5:
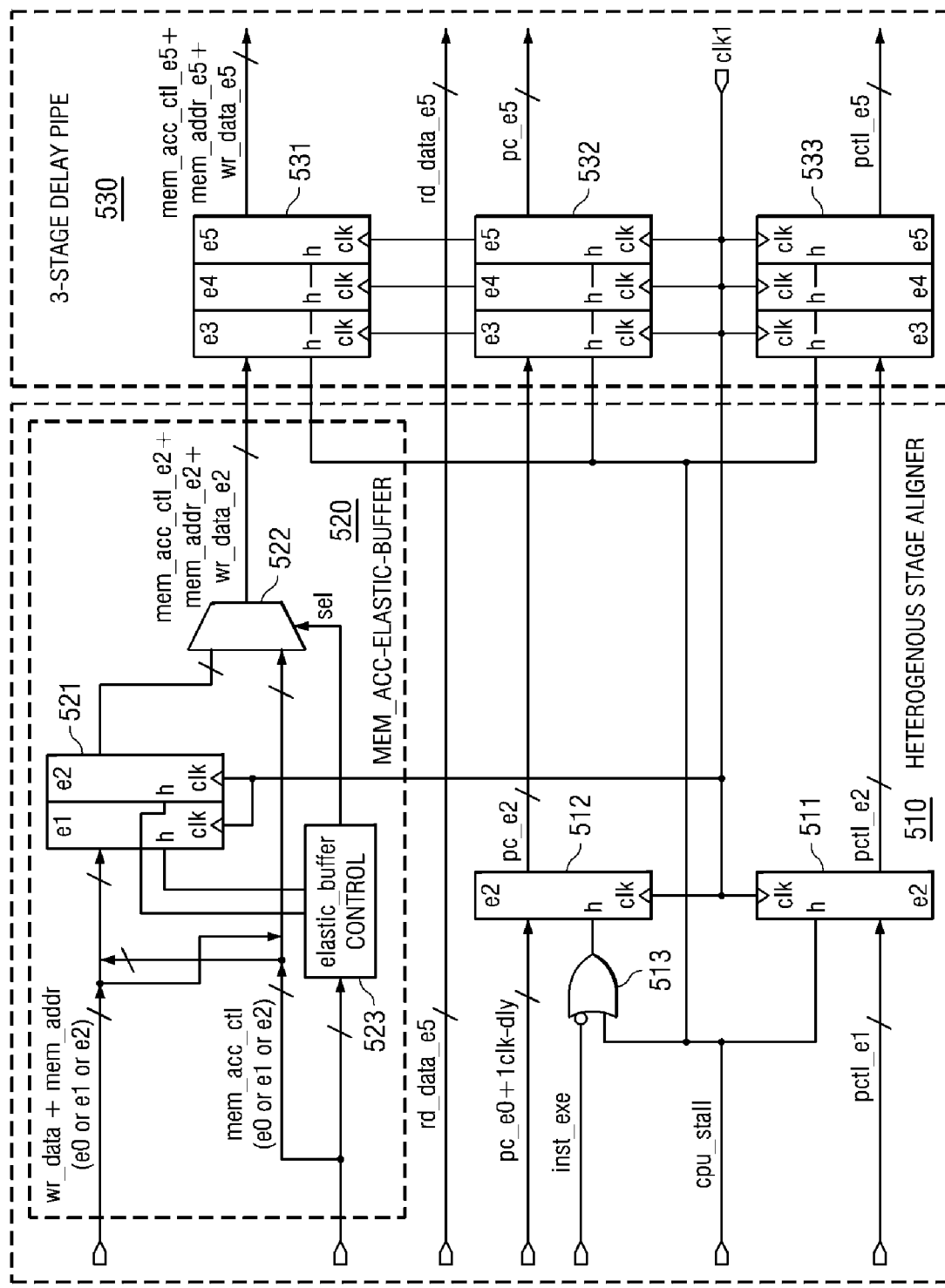
FIG. 5 illustrates in block diagram form the pipeline flattener of this invention.

FIG. 5 illustrates the pipeline flattener 401 of this invention. Pipeline flattener 401 achieves alignment of program counter (pc), pipeline-flow control information (pctl), memory access control (mem_acc_ctl), memory access address (mem_addr), memory access write data (wr_data) and memory access read data (rd_data).

Alignment is implemented in 2 steps. First, the data collected in early stages of the pipeline is aligned in a per case bases in order to account for the differences in the data collection behavior. This presents a simpler group of data to the second processing step. Heterogeneous stage aligner 510 performs this initial alignment step. Second, the data collected in the first step presents a single type of behavior. The 3-stage delay pipeline 530 aligns this data from the first stage as a group to the last arriving memory access read data (rd_data).

The point of collection of the last arriving memory access read data (rd_data) is the target point of alignment. In this example this point of collection is stage 5 of the pipeline (e5). As a first step towards the final alignment goal, the early arriving data is processed in various ways and aligned via heterogeneous stage aligner 510 to the second stage of the pipeline (e2). In order to be considered fully aligned to e2, the data should not be updated at the beginning of the clock cycle if the pipeline did not advance in the previous cycle. This is indicated by cpu_stall=1 in previous cycle. For the example illustrated in FIG. 5 there are 5 sources of early arriving data program counter (pc), pipeline-flow control information (pctl), memory access control (mem_acc_ctl), memory access address (mem_addr) and memory access write data (wr_data). These represent 3 independent data retention policies and require 3 different mechanisms in order to be aligned to pipeline state e2 as a group.

The pipeline-flow control information (pctl) data group is collected in pipeline stage e1. This data has a data retention policy similar to the policy of any stage in the architectural pipeline. Thus all that is required to align pipeline-flow control information (pctl) to pipeline stage e2 is the single stage pipeline delay element 511. Pipeline delay element 511 is implemented by a single register stage that updates when the pipeline advances (cpu_stall=0).

A second set of early collected data is the program counter (pc). The program counter is generated in pipeline stage e0. The program counter is delayed 1 clock cycle via a single register stage (not shown) and then presented at the input of heterogeneous stage aligner 510 as the signal pc_e0+1 clock delay. Program counter (pc) data is aligned to pipeline stage e2 via a single register stage in pipeline delay element 512.

Pipeline delay element 512 updates only when the pipeline advances (cpu_stall=0) and only if the current instruction in pipeline state e1 is a new instruction (inst_exe=1). OR gate 513 advances receives the cpu_stall signal and the inst_exe signal and insures pipeline delay element 512 advances only under these conditions. Enforcing these 2 conditions ensures that the aligned program counter (pc) value in pipeline stage e2 during multicycle instructions remains the same during all the cycles it takes to execute the instruction. This retention is in spite of the fact that the program counter (pc) retention policy will overwrite the program counter (pc) value presented after the first clock cycle of the instruction in pipeline stage e1.

The three remaining sets of early collected data are related to memory accesses. These are memory access control (mem_acc_ctl), memory access address (mem_addr) and memory access write data (wr_data). For the particular implementation illustrated in FIG. 5, the three sources of data have a similar data retention policy and are collected in the same pipeline stages. Thus the same mechanism is used in order to align them to pipeline state e2. These 3 pieces of data are architecturally generated in pipeline stage e2. However, due to some special needs of this particular implementation there are a few exceptional cases where the memory access data is collected in pipeline stages e1 and e0 rather than pipeline stage e2.

Memory access elastic buffer 520 copes with these alternatives. Received memory access control data (mem_acc_ctl) supplies the input to two stage pipeline delay element 521, the input to multiplexer 522 and an input to elastic buffer control 523. The memory access address (mem_addr) and memory access write data (wr_data) supply the input to pipeline delay element 521 and multiplexer 522. It should be understood that the memory access control data (mem_acc_ctl), the memory access address (mem_addr) and memory access write data (wr_data) are handled in parallel in pipeline delay element 521 and multiplexer 522.

The memory access control data (mem_acc_ctl) indicates the pipeline stage of collection of the memory access signals. Elastic buffer control 523 uses this indication to control pipeline delay element 521 and multiplexer 522. If the memory access data was collected during pipeline stage e2, then elastic buffer control 523 sends a select signal to multiplexer 522 to select the directly received memory access signals. If the memory access data was collected during pipeline stage e1, then elastic buffer control 523 sends a select signal to multiplexer 522 to select memory access signals from pipeline delay element 521. Elastic buffer control 523 also controls pipeline delay element 521 to insert one pipeline stage delay. If the memory access data was collected during pipeline stage e0, then elastic buffer control 523 sends a select signal to multiplexer 522 to select memory access signals from pipeline delay element 521. Elastic buffer control 523 also controls pipeline delay element 521 to insert two pipeline stage delays. This behavior is summarized in Table 2.

TABLE 2

| Data collected | Multiplexer 522 select | Pipeline delay element 521 |
|---|---|---|
| e0 | delayed data | 2 stage delay |
| e1 | delayed data | 1 stage delay |
| e2 | direct data | — |

The 3-stage delay pipeline 530 takes the homogeneously behaved data at its input already aligned to the second pipeline stage e2. Three-stage delay pipeline 530 includes pipeline delay element 531 for the memory access data, pipeline delay element 532 for the program counter data and pipeline delay element 533 for the pipeline-flow control information. Three-stage delay pipeline 530 outputs this data at pipeline stage e5. This is the same stage as the arrival of the read data (rd_data). Three-stage delay pipeline 530 sends every bit of input data through 3 serially connected registers that update its content every clock cycles that the pipeline is not stalled (cpu_stall=0). The clock signal clk1 is supplied to pipeline delay elements 511 and 512 and to every register of pipeline delay elements 521, 531, 532 and 533. The cpu_stall signal stalls pipeline delay elements 511, 512, 531, 532 and 533 when the central processing unit is stalled. Since the memory access data is not updated by heterogeneous stage aligner 510 during pipeline stall cycles, no data is lost during pipeline stalls. Pipeline flattener 501 effectively aligns the program counter (pc), pipeline-flow control information (pctl), memory access control (mem_acc_ctl), memory access address (mem_addr), memory access write data (wr_data) to the late received read data (rd_data) in pipeline stage e5.

Figure 6:
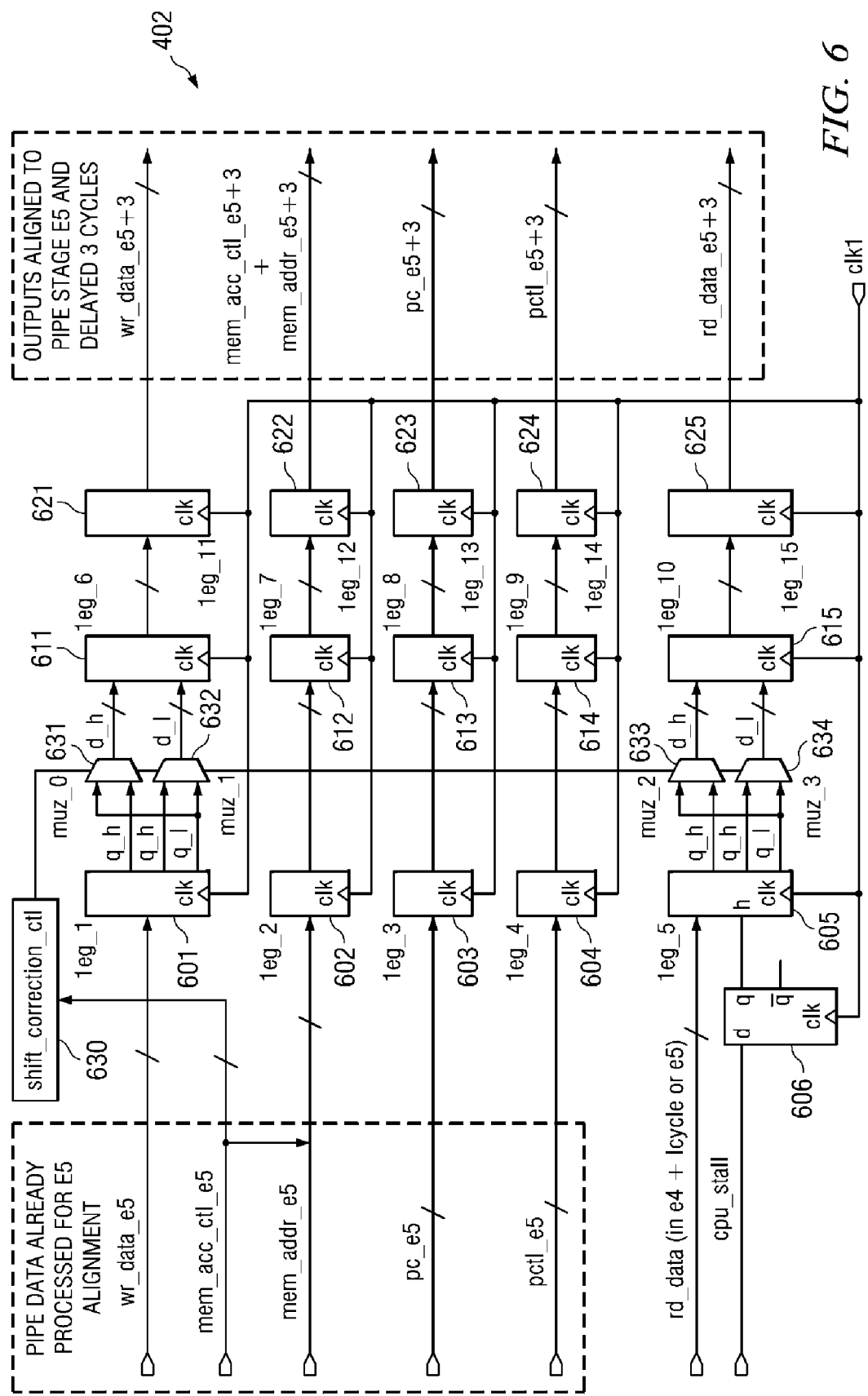
FIG. 6 illustrates in block diagram form one embodiment of the sliding alignment correction circuit of this invention.

FIG. 6 illustrates alignment circuit 402 in one embodiment of this invention. The data presented at the input of this circuit is aligned to the cycle and pipeline stage where the last set of data, the memory access read data (rd_data), becomes available. In this example the data processor has a five stage pipeline. Thus the write data (wr_data_e5), memory access control data (mem_acc_ctl_e5), memory address (mem_addr_e5), program counter (pc_e5) and pipeline-flow control information (pctl_e5) has been aligned with the late arriving read data (rd_data) in pipeline stage e5.

In FIG. 6 although all the data presented at the input of the circuit is be aligned to pipeline stage e5, there is an issue with 1 clock cycle sliding of read data (rd_data) that could cause it not to be correctly captured if the pipeline stalls. The 1 clock cycle sliding of read data (rd_data) happens when the read data (rd_data) presented at the input boundary of the circuit as it updates one more cycle once the pipeline stalls. As part of this behavior the same source of read data (rd_data) will not be updated like the rest of the aligned data at the beginning of the second pipeline advance cycle after the stall. In other words the 1 cycle sliding of the read data (rd_data) could be described as a 1 cycle delay on response to the stall or advance taking place in the pipeline.

In order to prevent the potential lost of the read data, additional registering stage is inserted in the path of the data. This one pipeline stage delay is implemented via pipeline delay elements 601, 602, 603, 604 and 605. The pipeline delay element 605 provides storage to capture the read data (rd_data) and eliminates the loss of read data associated with the instruction in pipeline state e5 being overwritten when the read data in pipeline stage e4 slides into pipeline stage e5 during the first cycle of a CPU stall window. Pipeline delay elements 601, 602, 603 and 604 do not hold data and have been added as delay elements to compensate for the delay of pipeline delay register 605, which captures and holds the read data. In order to remove the 1 clock slide in the read data, the hold signal supplied to pipeline delay register 605 is a 1 clock delayed version of the pipeline stall signal (cpu_stall) provided by delay element 606.

FIG. 6 illustrates two additional register stages in each data path: pipeline delay elements 611 and 621 in the write data path, pipeline delay elements 612 and 622 in the memory access control data and the memory address paths; pipeline delay elements 613 and 623 in the program counter path; pipeline delay elements 614 and 624 in the pipeline-flow control information path; and pipeline delay elements 615 and 625 in the read data path. These two additional stages add additional latency specific to this implementation of the preferred embodiment of the invention. The 3 additional register stages alignment circuit 602 do not represent additional pipeline stages, they only add clock latency to the implementation. The data at the output of alignment circuit 602 is the contents of pipeline stage e5 in the pipeline delayed by 3 clock cycles.

The correction to the N-bit sliding on the memory data is done via an N-bit slide operation in the opposite direction to the slide of the data. The data bus is assumed to be 2 words wide in this embodiment. The sliding of data at the input is limited to a swapping between the upper and lower words of the bus. Shift correction circuit 630 receives the memory access control signal and detects the sliding condition. Shift correction circuit 630 controls multiplexers 631, 632, 633, and 634 to enable or disable a swap of the most significant and least significant bits. In order to restore the architectural view of the data it is necessary to align the least significant bits of the write data and the read data to the least significant bits of the data bus. On a normal state of the multiplexer control signal from shift control circuit 630 multiplexer 631 selects the most significant bits from pipeline delay element 601 to output to the most significant bits of pipeline delay element 611, multiplexer 632 selects the least significant bits from pipeline delay element 601 output to the least significant bits of pipeline delay element 611, multiplexer 633 selects the most significant bits from pipeline delay element 605 to output to the most significant bits of pipeline delay element 615, multiplexer 634 selects the least significant bits from pipeline delay element 605 output to the least significant bits of pipeline delay element 611. In the opposite swap state multiplexer 631 selects the least significant bits from pipeline delay element 601 to output to the most significant bits of pipeline delay element 611, multiplexer 632 selects the most significant bits from pipeline delay element 601 output to the least significant bits of pipeline delay element 611, multiplexer 633 selects the least significant bits from pipeline delay element 605 to output to the most significant bits of pipeline delay element 615, multiplexer 634 selects the most significant bits from pipeline delay element 605 output to the least significant bits of pipeline delay element 611. This swaps the most significant bits with the least significant bits of both the write data and the read data.

Figure 7:
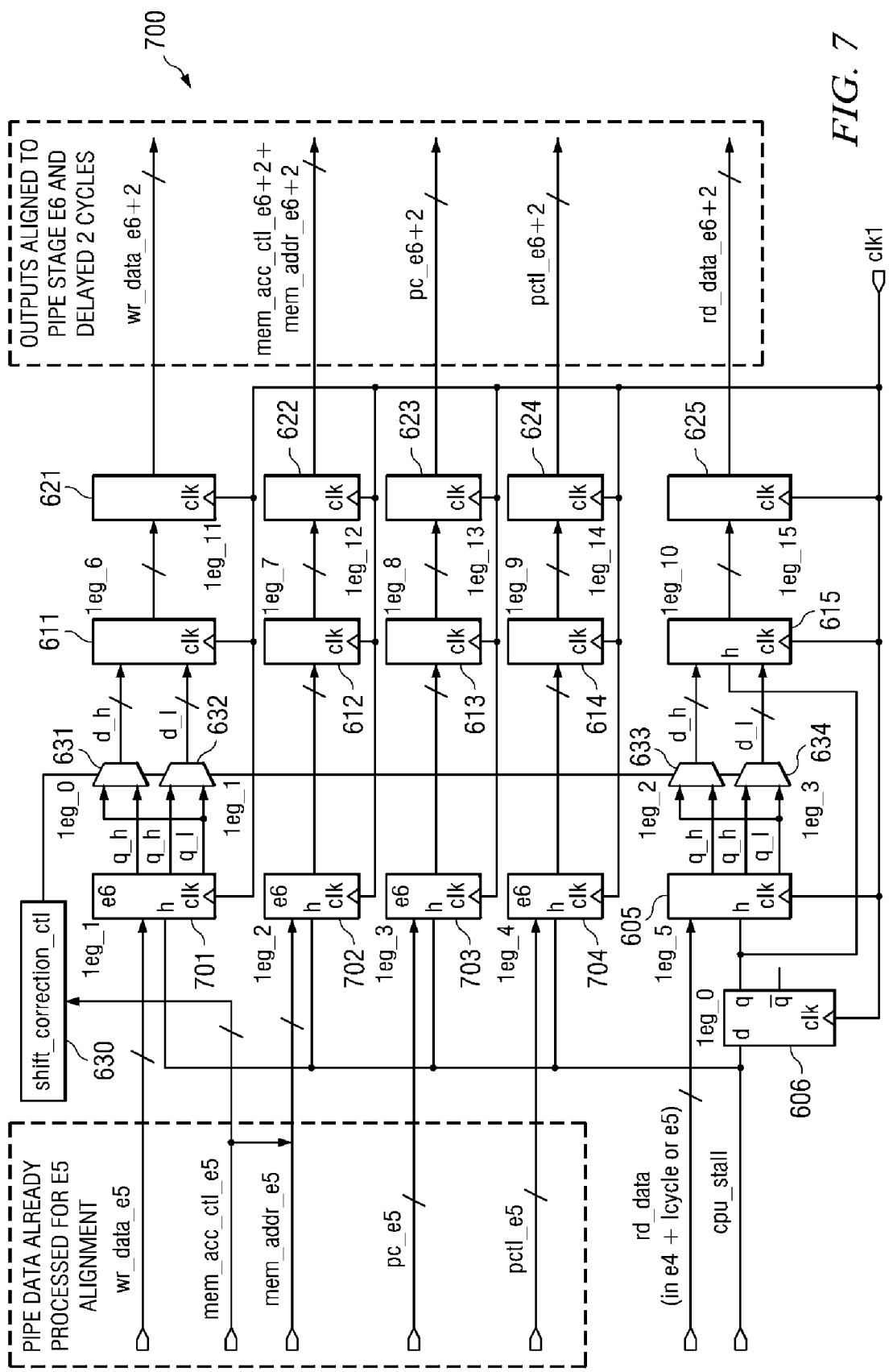
FIG. 7 illustrates in block diagram form an alternative embodiment of the sliding alignment correction circuit of this invention.

FIG. 7 illustrates adjustment circuit 700 in an alternative embodiment of this invention. In this alternative clock delay elements 401, 402, 403, 404 and 415 are replaced with respective pipeline delays elements 701, 702, 703, 704 and 715. An additional pipeline delay has been added by holding the contents of pipeline delay elements 701, 702, 703, 704 and 715 by connecting their hold inputs to the cpu_stall signal. As a result the pipeline data aligned to pipeline stage e5 presented as input of adjustment circuit 700 will require that the pipeline advances one more stage to pipeline stage e6, before it could be propagated via 2 stages of latency to the output.

Consider an example where the data processor interfaces with trace collection 230 via two data ports. The following combination of activities are possible: data on port 0 only; data on port 1 only; and data on both port 0 and port 1. If there are any markers present, these markers are received with the data log that came first. Therefore the following writes are possible in the data log first-in-first-out (FIFO) buffer at any time: data from port 0 only; data from port 0 only with a marker; data from port 1 only; data from port 1 only with a marker; data from both port 0 and port 1; data from port 0 and port 1 with a marker with the data from port 0.

The complete data is not transmitted. Instead data compressed in differential relative form. The data is exclusive-Ored with the previous data. Tables 3 and 4 show examples of data compression. No data compression is possible in the example of Table 4.

TABLE 3

| Previous data | 11111111 | 11101111 | 11111101 | 10000001 |
|---|---|---|---|---|
| New data | 11110111 | 11111111 | 11111111 | 10000011 |
| XOR new and previous data | 00001000 | 00010000 | 00000010 | 00000010 |
| Match (0)/Miscompare (1) bytes | 1 | 1 | 1 | 1 |
| Compression Byte Map | 1 | 1 | 1 | 1 |
| Compression Byte Map sent? | | No, no bytes XOR match | | |
| Send bytes | sent | sent | sent | sent |
| | | Bytes 3 to 0 are sent | | |

Table 4 shows an example where data can be compressed. A compression map is sent which indicates which bytes are being sent.

TABLE 4

| Previous data | 11111111 | 11111111 | 11111111 | 00000000 |
|---|---|---|---|---|
| New data | 11101111 | 11111111 | 11111111 | 00000000 |
| XOR new and previous data | 00010000 | 00000000 | 00000000 | 00000000 |
| Match (0)/Miscompare (1) bytes | 1 | 0 | 0 | 0 |
| Compression Byte Map | 1 | 0 | 0 | 0 |
| Send bytes | sent | dropped | dropped | dropped |
| | Byte 3 is sent | | | |

Bytes 0 to 2 of the new data match the corresponding bytes of the previous data. Therefore in this example only byte 3 is sent. Bytes 0 to 2 are not sent. The compression map enables the receiving system to reconstruct the new data from the transmitted byte and the previous data.

The previous data value is saved in a reference register. The reference register values are determined as follows. When there is a data marker, this reference register is reset to 0. If there is data on port 0 only, the reference register is set to the data value of that port. If there is data on port 1 only, the reference register is set to the data value of that port. If there is data on port 0 and port 1, the reference register is set to the data value of port 1.

The data is transmitted to the user as follows. If data is received from port 0 only, then data is transmitted with respect to the reference register. If data is received from port 0 only with a marker, then data is transmitted with respect to zero. This is if as the reference register has been reset to 0. If data is received from port 1 only, then data is transmitted with respect to the reference register. If data is received from port 1 only with a marker, then data is transmitted as if the reference register had been reset to 0. If data is received from both port 0 and port 1, then data for port 0 is sent with respect to the reference register. In this case, data for port 1 is sent with respect to data from port 0. If data is received from both port 0 and port 1 with a marker with the data from port 0, then data for port 0 is sent as if the reference register has been reset to 0. In this case, data for port 1 is sent with respect to data from port 0.

Figure 8:
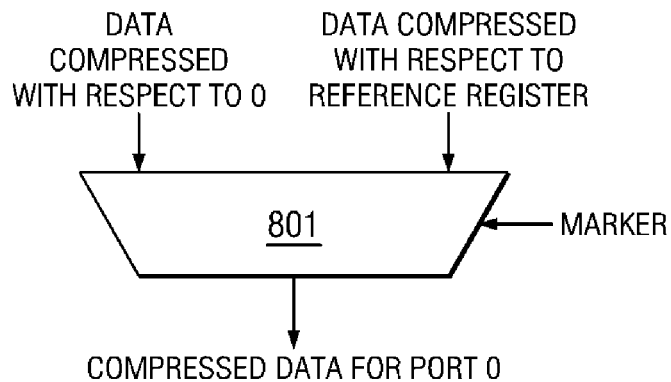
FIG. 8 illustrates a multiplexer which selects compressed data for a first trace port.
Figure 9:
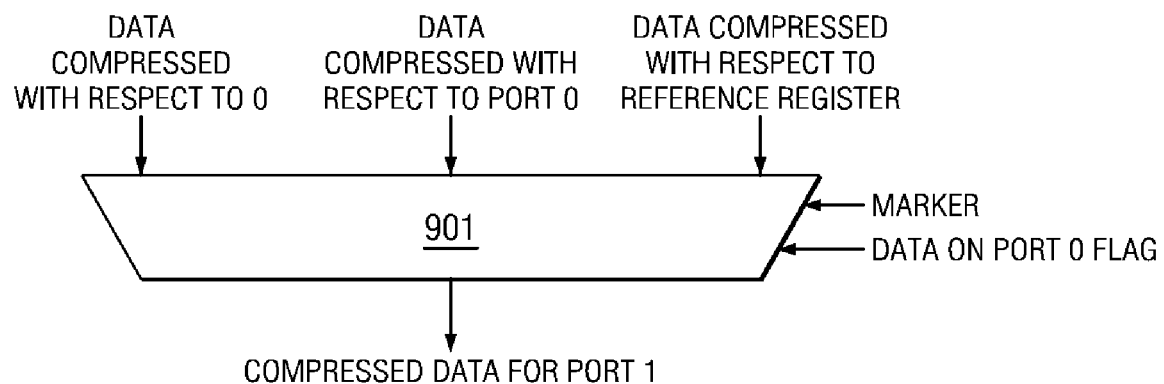
FIG. 9 illustrates multiplexer which selects compressed data for a second trace port.

FIGS. 8 and 9 illustrate these selections. FIG. 8 illustrates multiplexer 801 which selects compressed data for port 0. Multiplexer 801 receives at a first input data for port 0 compressed with respect to 0. Multiplexer 801 receives input data compressed with respect to the reference register at a second input. Multiplexer 801 receives a signal indicating whether port 0 includes a marker at a control input. The output of multiplexer 801 is the data to be transmitted. As noted above, for port 0 if there is a marker, then data is sent out with respect to 0, else with respect to the reference register.

FIG. 9 illustrates multiplexer 901 which selects compressed data for port 1. Multiplexer 901 receives three input. The first input is the data for port 1 compressed with respect to 0. The second input is the data for port 1 compressed with respect to the data of port 0. Mulitplexer 901 receives two control inputs. Multiplexer 901 selects among the three inputs according to Table 5.

TABLE 5

| Marker | Data on port 0 | Data source |
|---|---|---|
| N | N | C |
| Y | N | A |
| — | Y | B |

To handle possibly two data logs coming in the same cycle, the first-in-first-out(FIFO) buffer has two write ports. However since the read is done serially, only a single read port is needed. However, if the read finite state machine is heavily pipelined, it is possible that there is a need to look ahead in the FIFO buffer. In that case it will be necessary to have two read ports in the FIFO buffer.

What is claimed is:

1. A trace data compression apparatus in a trace system capable of receiving trace data on a first port and a second port comprising:

a prior data register storing a prior data value;

a first comparator having a first input receiving trace data on said first port and a second input connected to said prior data register, said first comparator comparing respective equal length sections of said trace data currently received on said first port with said stored prior data value and generating a first compression map having individual bits corresponding to said respective equal length sections, each individual bit having a first digital state if said respective equal length sections match and a second opposite digital state if said respective equal length sections do not match;

a second comparator having a first input receiving trace data on said second port and a second input connected to said prior data register, said second comparator comparing respective equal length sections of said trace data currently received on said second port with said stored prior data value and generating a second compression map having individual bits corresponding to said respective equal length sections, each individual bit having a first digital state if said respective equal length sections match and a second opposite digital state if said respective equal length sections do not match;

a third comparator having a first input receiving trace data on said first port and a second input receiving trace data on said second port, said third comparator comparing respective equal length sections of said trace data currently received on said first port with said trace data currently received on said second port and generating a third compression map having individual bits corresponding to said respective equal length sections, each individual bit having a first digital state if said respective equal length sections match and a second opposite digital state if said respective equal length sections do not match;

a trace data selection apparatus receiving trace data on said first port, a receiving trace data on said second port and connected to said first, second and third comparators, said trace data selection apparatus operative to if trace data is currently received on said first port and not on said second port, transmit data corresponding to said trace data currently received on said first port by transmitting said first compression map and sections of said trace data currently received on said first port for which said corresponding bit of said compression map has said second digital state;

if trace data is currently received on said second port and not on said first port, transmit data corresponding to said trace data currently received on said second port by transmitting said second compression map and sections of said trace data currently received on said second port for which said corresponding bit of said compression map has said second digital state; and if trace data is currently received on both the first port and the second port, then transmitting data corresponding to said trace data currently received on the first port by transmitting said first compression map and sections of said trace data currently received on the first port for which said corresponding bit of said first compression map has said second digital state, and transmitting data corresponding to said trace data currently received on the second port by transmitting said third compression map and the sections of said trace data currently received on the second port for which said corresponding bit of said third compression map has said second digital state.

2. The trace data compression apparatus of claim 1, further comprising:

a trace trigger detector operable to receive signals from a data processing apparatus indicative of data processing operation, detect a plurality of events from said signals indicative of data processing operation, initiate generation of trace data at the first port upon detection of a first set of at least one event, terminate generation of trace data at the first port upon detection of a second set of at least one event, initiate generation of trace data at the second port upon detection of a third set of at least one event, terminate generation of trace data at the second port upon detection of a fourth set of at least one event, generate a marker upon each initiation and termination of trace data at the first port, and generate a marker upon each initiation and termination of trace data at the second port; and said prior data register is connected to said trace trigger detector and is further operable to reset the stored prior data to zero upon generation of a marker.

3. The trace data compression apparatus of claim 2, wherein:

said prior data register is connected to said first port and said second port and is further operable to store said trace data currently received on the second port as the stored prior data if trace data is currently received on the second port, and store said trace data currently received on the first port as the stored prior data if trace data is currently received on the first port and no trace data is currently received on the second port.

4. The trace address compression apparatus of claim 1, wherein:

each equal length section has a length equal to 8 bits.

* * * * *